May 6, 1941.  M. KNAB  2,241,141
WINDING MACHINE
Filed Dec. 22, 1938  7 Sheets-Sheet 2

INVENTOR.
MAX KNAB
BY
Dorsey, Cole & Garner
ATTORNEYS

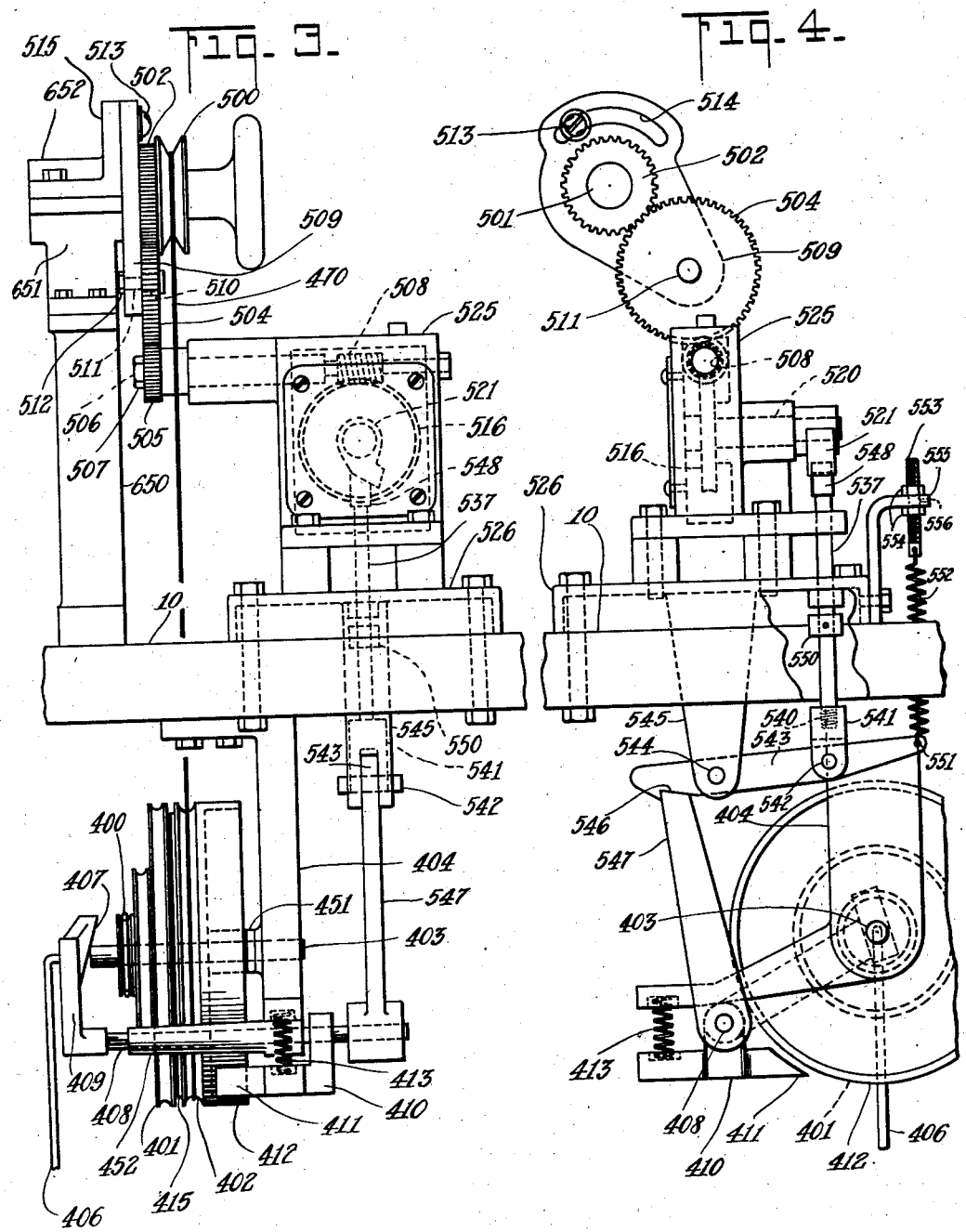

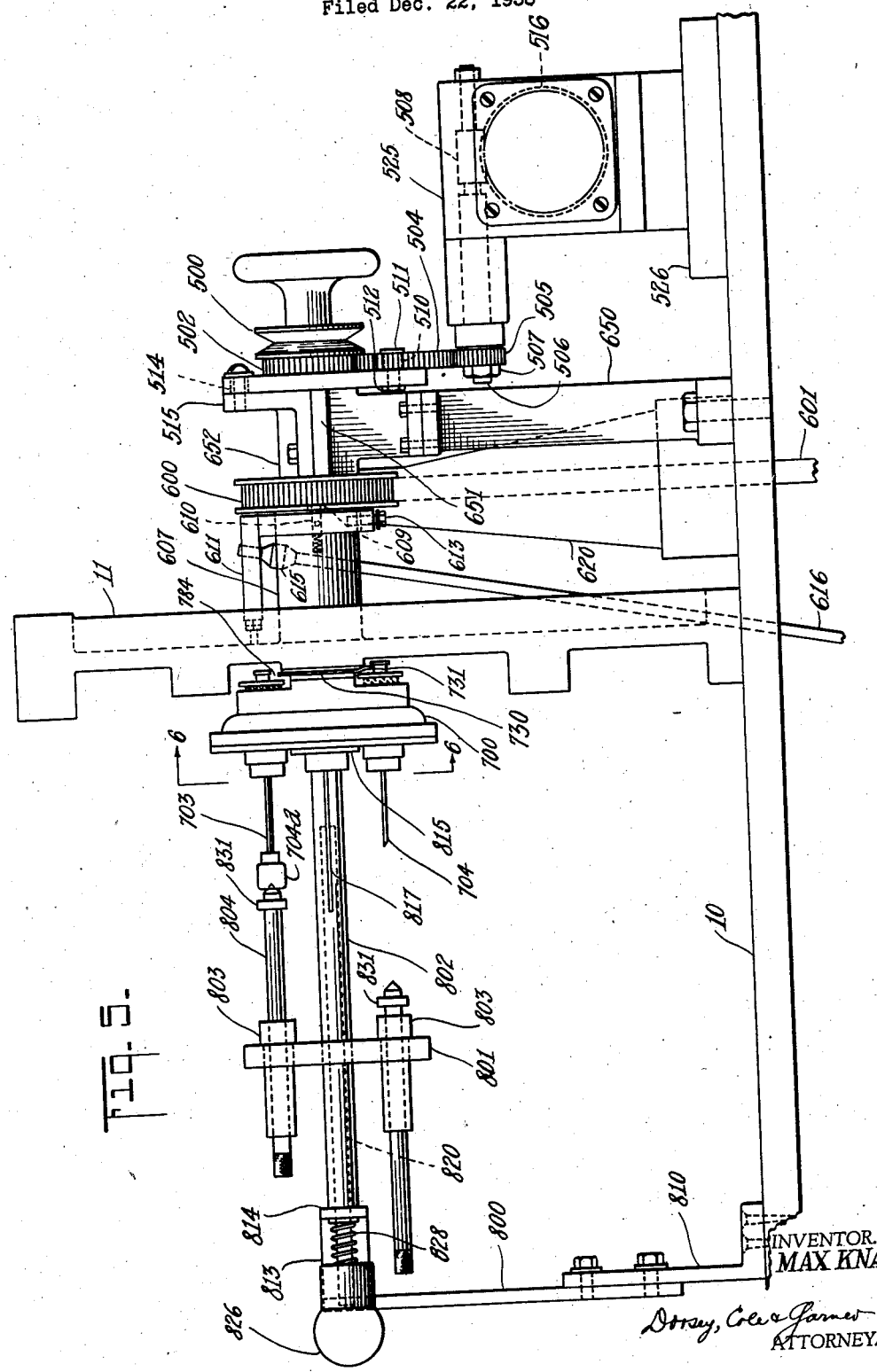

May 6, 1941.　　　　M. KNAB　　　　2,241,141
WINDING MACHINE
Filed Dec. 22, 1938　　　　7 Sheets-Sheet 5
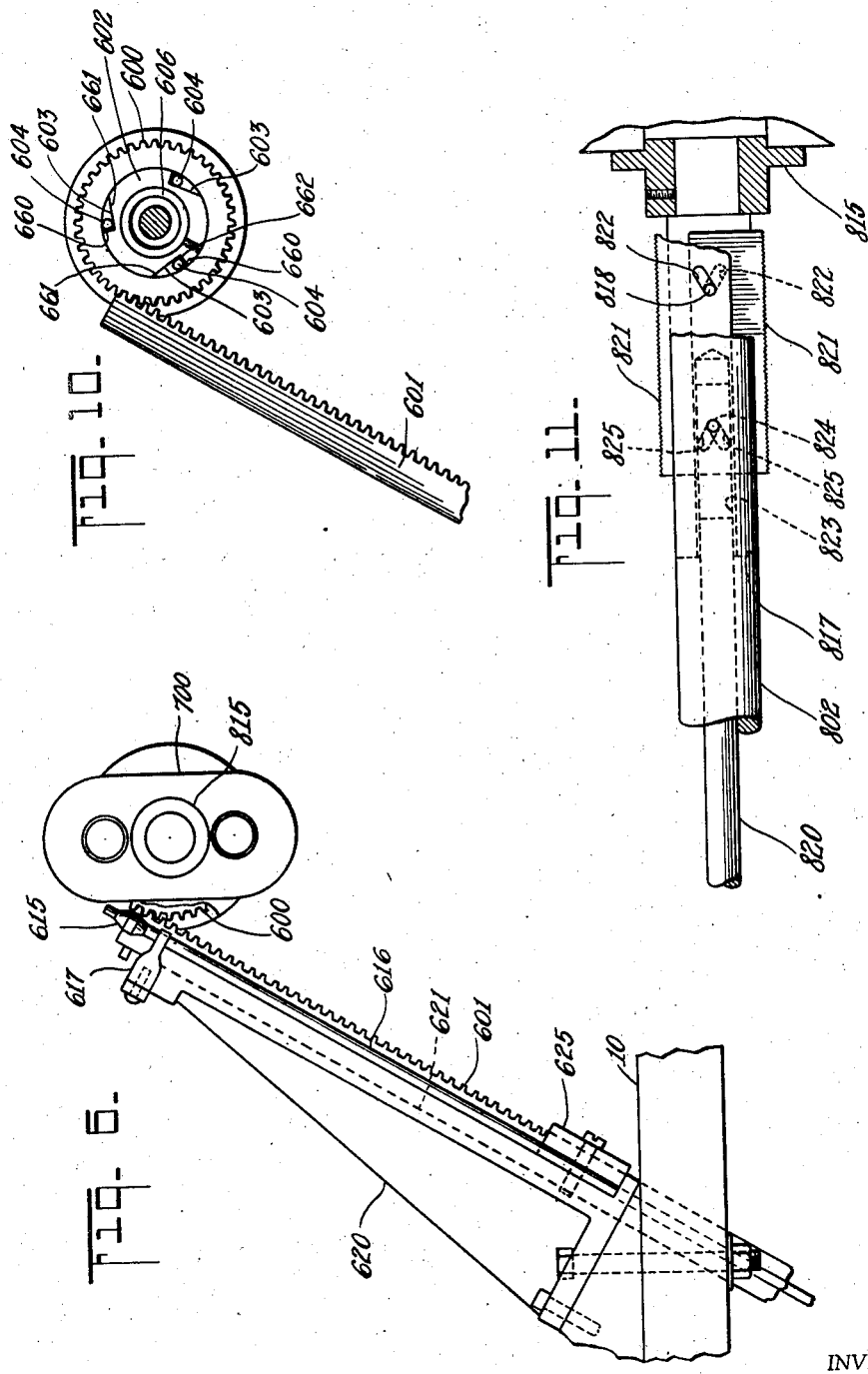
INVENTOR.
MAX KNAB
BY
Dorsey, Cole & Garner
ATTORNEYS

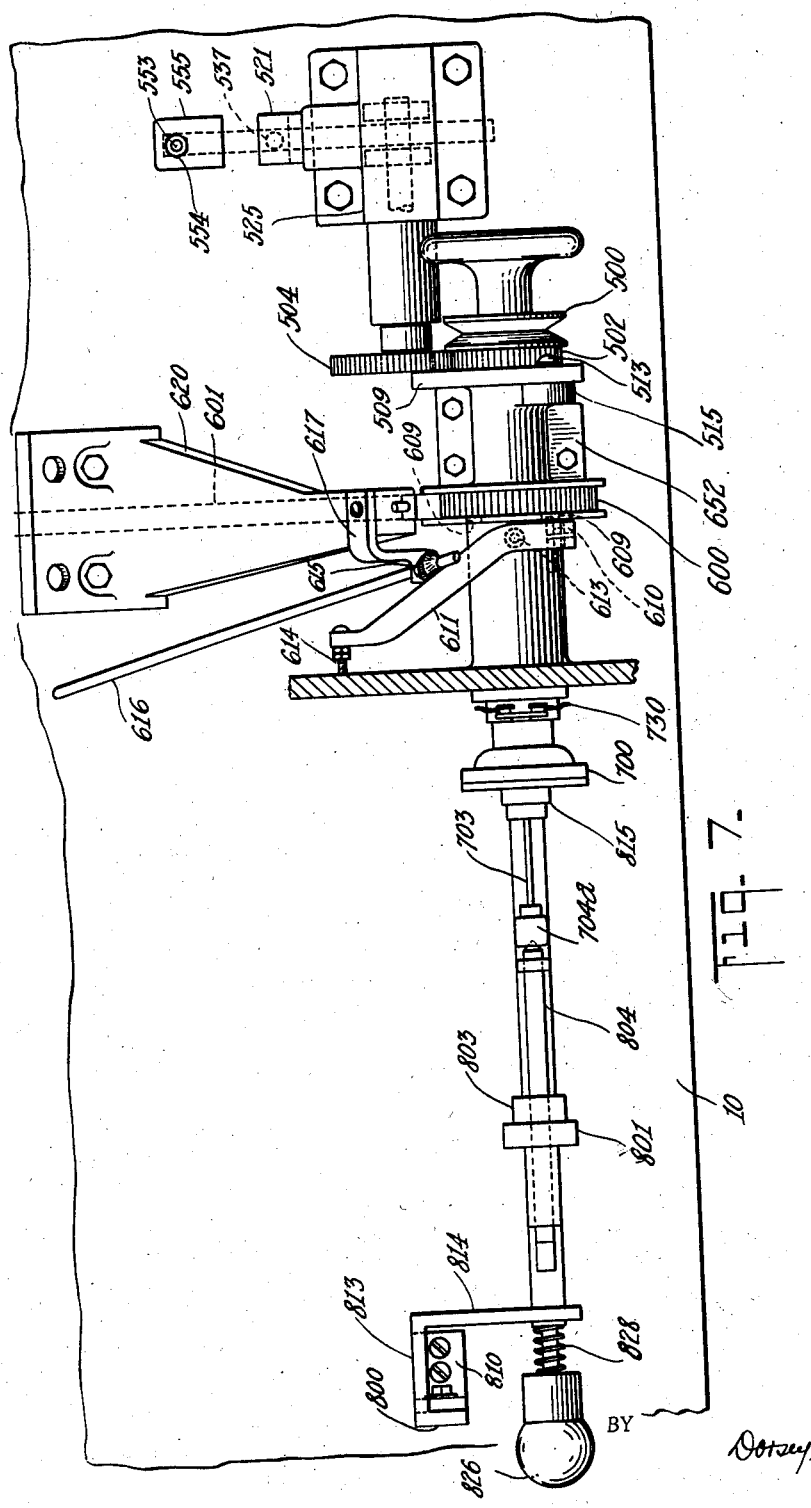

May 6, 1941.	M. KNAB	2,241,141
WINDING MACHINE
Filed Dec. 22, 1938	7 Sheets-Sheet 7
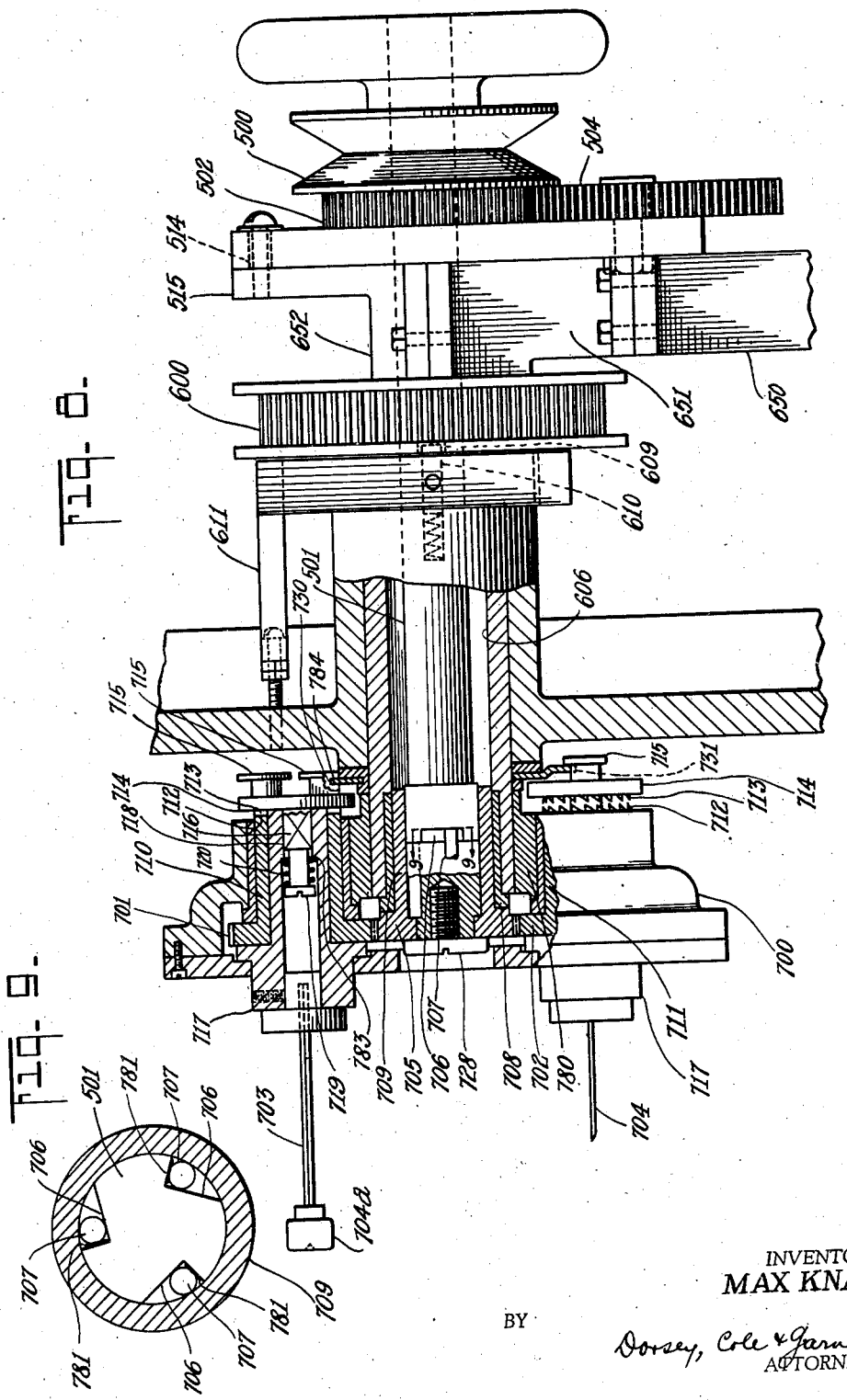
INVENTOR.
MAX KNAB
BY
Dorsey, Cole & Garner
ATTORNEYS Patented May 6, 1941

2,241,141

UNITED STATES PATENT OFFICE 2,241,141

WINDING MACHINE

Max Knab, Brooklyn, N. Y., assignor to Sprague Specialties Co., North Adams, Mass., a corporation of Massachusetts Application December 22, 1938, Serial No. 247,292

10 Claims. (Cl. 242—56)

The present invention relates to winding machines and more particularly to winding machines for mass production of coiled articles to be wound to a predetermined number of turns.

My invention will be described in connection with an embodiment thereof designed for the winding of electrical condensers, but it should be well understood that my invention is not limited to the winding of condensers, and its various novel features are equally suitable for winding machines for magnet coils, resistors, etc., and other coiled articles.

Electrical condensers as a rule comprise two conducting strips separated by interposed dielectric strips. The conducting strips are usually metal foils, such as tin foil or aluminum foil, and the dielectric strips are usually paper, Cellophane or the like.

To wind a condenser the metal and dielectric strips are fed to a winding mandrel from so-called endless stock rolls, the strips are secured to the mandrel, the mandrel rotated manually or by motor for a given number of turns, after which the strips are severed from the stock and the wound condenser roll removed from the mandrel.

The proper alignment of the strips, the winding to the proper number of turns, and severance of the strips from the stock require considerable skill from the operator, and even with highly skilled operators the speed of operation is limited and errors in the proper alignment and winding to the proper number of turns are frequent because of the human element involved.

It has already been proposed to obviate these shortcomings by providing machines with automatic features; however, the automatic and semi-automatic winding machines so far proposed were complicated and fell short of their purpose.

My invention relates to a winding machine which altogether eliminates the human element as far as the speed and accuracy of winding are concerned, and permits thereby the winding of condensers at speeds and with an accuracy heretofore unachieved.

In the machine of my invention I provide a winding head having two winding mandrels alternately placed in their winding position. When the winding of a condenser roll has been completed on one of the mandrels, the second mandrel is thrown into its winding position, and since the stock strips automatically assume a proper relation to this mandrel they can be facilely secured thereto without requiring any special skill of the operator. Upon severance of the strips of the condenser roll from the stock by means of a semi-automatic device, a condenser roll can be wound on the second mandrel during the winding of which the operator without loss of time removes the finished condenser roll from the first mandrel. The winding of the condenser roll to the proper number of turns is entirely automatic, requiring no attention of the operator whatsoever and can take place at very high speeds.

In addition the device which controls the winding of the condenser roll to the exact required number of turns is such as to permit a simple change-over of the machine for the winding of condensers of a different number of turns from the one previously wound.

Among the various specific features of the invention are also means to automatically slow down the winding machine before it is brought to a stop upon completion of the winding of a condenser roll.

Another novel feature of my invention is a means to permit the changeover from one winding mandrel to the other winding mandrel while maintaining the exact relative position between either one of the winding mandrels and the means which serve to control the number of turns to be wound.

The various novel features of my invention will be more clearly understood by referring to the drawings forming part of the specification, in which:

Fig. 3 is a front elevation of the automatic control mechanism, showing also the drive and clutch mechanism for supplying power to the winding mechanism;

Fig. 4 is a side elevation of the mechanism of Fig. 3;

Fig. 5 is a front elevation of the winding head mechanism and its associated parts;

Fig. 6 is a partly sectionized side elevation of the winding head along line 6—6 of Fig. 5 with its shifting mechanism, parts not essential to the shifting mechanism being omitted for convenience of illustration;

Fig. 7 is a top view of Fig. 5;

Fig. 8 is a sectional view of the winding mandrel head.

Fig. 9 is an enlarged sectional view of the roller clutch of the winding head shown along line 9—9 of Fig. 3;

Fig. 10 is a side elevation of the winding head shifting mechanism;

Fig. 11 is a top view of the cutting knife.

Figure 1:
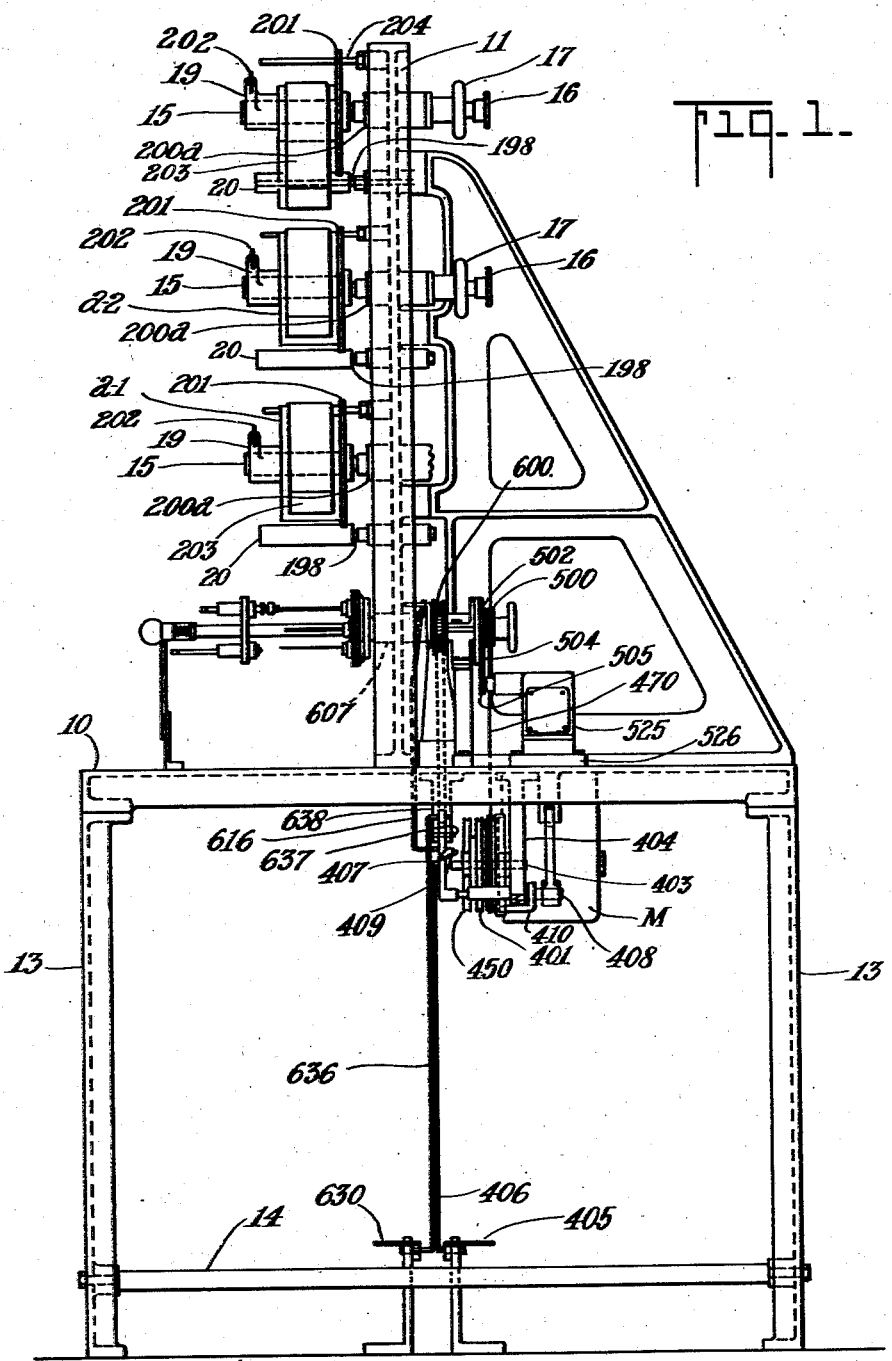
Figure 1 is a front elevation of a condenser-winding machine embodying the invention.

Referring to the drawings, and more particularly to Figs. 1, 2, 3, and 4, the winding machine there shown comprises a bed-plate 10 supported by cast iron legs 13—13 which are suitably reinforced by a pair of upper and a pair of lower braces 13a—13a, the lower braces being also held together by a transversal tie rod 14. The bed-plate 10 carries a vertical frame 11 which is suitably reinforced, and provided with a plurality of bored bosses 200a serving as bushings for corresponding spindles 15, adapted to carry stock rolls a—1, a—2, etc.

In the drawings eight such spindles 15 are shown, corresponding to the eight stock rolls a—1 to a—8, of which a—1 and a—5 are metal foil rolls and the remainder paper rolls, the relative disposition of these rolls being such that in winding, three paper strips are interposed between the two strips of metal foil. It should of course be understood that the number of metal foil and paper rolls depends on the actual type of condensers to be wound.

For proper alignment of their respective strips the spindles 15 are laterally adjustable by means of hand wheels 16, and the so-adjusted spindles are then locked in position by locking wheels 17.

The spindles 15 also carry guide flanges 201 having preferably a larger diameter than is the maximum diameter of the stock roll placed on it. Each stock roll is held against its guide flange 201 by a clamping collar 19 slipped over the spindle 15 and secured in position by means of a butterfly nut 202.

Supporting studs 204, projecting from the frame 11, carry weighted band-brakes 203, which are swung over the stock rolls and serve as retarding and proper tensioning means for the same.

For the feeding and guiding of the strips from the stock rolls towards the winding mandrel—to be later described—there are provided successively a plurality of rollers in the path of the strips. First the strips are passed over individual rotatable rollers 20, carried on spindles 198 supported from the frame 11, and then over rotatable rollers 21, provided on spindles 220 supported in the frame 11, these spindles being preferably arranged as a banked unit.

From the individual rollers 21 the strips pass to and between a common gathering roller pair 23 and 24 from which the composite strip is fed to the winding mandrel and wound around it in a manner later to be described.

The driving and automatic control mechanism is illustrated in its general arrangement and in detail in Figs. 1 to 4. A driving motor M suitably mounted underneath the bed-plate 10 transmits power from a three-step pulley 450 by means of a belt 400 to a power transmission mounted by means of a bracket 404 underneath the bed-plate 10.

The power transmission, as shown in detail in Figs. 3 and 4, comprises a shaft 403 supported from the bracket 404. A three-step pulley 401 corresponding to the three-step pulley 450 of the motor and engaging with one of its steps the complementary step of the latter by means of belt 400—is fixedly secured to the shaft 403. Loosely mounted on shaft 403 and free to rotate on same is a pulley 402 provided on its left face with a friction disc 415 adapted to form a clutch with the opposing face of pulley 401. To the right the pulley 402 extends into a brake drum 412 adapted to cooperate with a brake shoe 411. Lateral displacement of the pulley 402 toward the bracket 404 is prevented by a thrust bearing 451 interposed between it and the bracket 404.

The supporting bracket 404 carries in front and below the shaft 403 a second shaft 408 supported in a suitable bushing 452. The shaft 408 is adapted to be swung clockwise, when viewed from the right as shown in Fig. 4—about a limited arc.

For this purpose the shaft 408 is provided on its left end with a perpendicularly-extending arm 409 actuated through a rod 406 from a foot pedal 405. At its free end the arm 409 forms a wedge member 407, which when the shaft 408 is swung clockwise by actuation of the foot pedal, presses against the end face of shaft 403, causing the latter's displacement towards the right, thereby engaging the pulley 401 with the clutch disc 415.

Secured to the shaft 408 beyond the bracket 404 is an L-shaped arm 410 which carries the brake shoe 411 biased by a spring 413 and normally pressing against the drum 412.

When by actuation of the foot pedal 405 by the operator the shaft 408 is swung in a clockwise direction, engagement of the clutch disc 415 and releasing of the brake 411 from the brake drum 412 causes the pulley 402 to rotate in unison with pulley 401.

Rotation of pulley 402 in turn produces rotation of a winding shaft 501 of the winding machine through the coupling afforded by a belt 470 and a pulley 500 on the shaft 501.

Shaft 501 is carried at one end within a split bearing consisting of an upper portion 652 and a lower portion 651 secured to a pedestal 650 mounted on the bed-plate 10. The other end of shaft 501 is carried within a bushing 607 of the frame 11 in a manner later to be more fully described.

The control mechanism for the winding machine and the members connecting it with the winding shaft 501 are shown in detail in Figs. 3 and 4.

Disposed on the winding shaft 501, adjacent to the pulley 500 is a driver gear 502. Supported from the bearing portion 652 by a bracket 515 and disposed on the shaft 501 adjacent to the gear 502, is an adjustable idler gear arm 509 through a bushing 510 of which passes a bolt 511 carrying a freely rotatable idler gear 504 secured in position by locking nuts 512—512 engaging the threaded end of bolt 511.

The gear arm 509 is provided with a circular adjustment slot 514 through which passes a bolt 513 threadedly engaging the bracket 515.

A change gear 505 carried by a spindle shaft 506 is secured to this shaft by a nut 507. The change gear 505 is easily removable and serves as the adjustment means for the control mechanism of the winding machine. Thus in winding condensers of a greater or lesser number of turns a gear 505 having a correspondingly greater or lesser number of teeth is used. To provide for proper engagement of the gears 502, 504 and 505, the idler gear 504 is correspondingly located by shifting of the arm 509 along the slot 514 which is then locked in position by the bolt 513.

Also carried by the shaft 506 is a worm 508 which engages a worm gear 516 disposed on a shaft 520 the axis of which is perpendicular to shaft 506.

Worm gears 508 and 516 are enclosed in a suitable housing 525 mounted on a hollow base 526 supported by the bed-plate 10. The shaft 520 suitably supported by the housing 525 extends therefrom and is provided on its extending portion with a cam 521 fixedly secured thereto.

The gear ratios of the gears and worms above referred to are preferably so selected that the number of teeth of the change gear 505 is equal to the number of the turns of the condenser to be wound, and that the cam 521 makes one complete revolution when the condenser is wound to its required number of turns.

The cam 521 cooperating with a beveled cam-follower 548 carried by a push-rod 537, is so shaped as to engage, and gradually depress the push-rod 537 as the cam 521 is about to complete its revolution, and to suddenly disengage the push-rod 537 as the cam assumes its zero position after completion of its revolution. Push-rod 537 properly guided extends with its lower threaded end 540 below the bed plate 10 and adjustably carries thereon a stirrup 541.

In its upward motion the push-rod 537 is limited by a collar 550 abutting against the bottom of the hollow base 526.

The stirrup 541 engages by means of a pivot pin 542 a lever 543 which upon downward movement of the push-rod 537 is subjected to a limited clockwise displacement about a fulcrum pivot 544 supported from an arm 545 projecting downwardly from the base 526.

In its portion extending to the left of the pivot 544, the lever 543 is provided with a hooked recess 546 adapted to engage the end of a lock arm 547 carried by and secured to the shaft 408.

On its right end the lever 543 has an aperture 551 into which is hooked one end of an adjustably tensioned coil spring 552. The spring 552 passing upwardly through the bed-plate 10 and with its upper end engaging a threaded rod 553 carried from the base 526 by a bent bracket 555 acts to bias the lever 543 in a counter-clockwise position. The spring 552 is adjustably tensioned by means of two nuts 554 each provided on opposite sides of the bracket 555 on the rod 553. Spring 552 is locked in its adjusted position by a set screw 556.

Disposed between the split bearing comprising portions 651 and 652 and the bushing 607 is a mandrel head rotator mechanism shown in greater detail in Figs. 5, 6, 7, 8 and 10.

It comprises a mandrel head rotating sleeve 606 extending from both sides of the bushing 607, concentrically surrounding the shaft 501 and later to be referred to in greater detail. The sleeve 606 fixedly carries on its portion extending to the right of the bushing 607 a cylindrical clutch disc 602 which in turn is concentrically surrounded by a pinion gear 600.

The clutch disc 602, as shown in Fig. 10 is provided with three symmetrically spaced recesses 603 each having a short radial side 660 and a longer side 661 perpendicular to 660. Within each recess is provided a roller 604 having a diameter slightly less than the depth of the short side 660, the roller 604 contacting along the inside surface of the pinion gear 600. Between the roller 604 and the short side 660 is provided a tensioned leaf-spring 662. The clutch disc 602 is thereby arranged in free-wheeling engagement with pinion gear 600. Thus when the gear 600 is rotated clockwise, the rollers 604 cause the clutch disc 602 and through it the sleeve 606 to rotate in unison with the gear 600. However, when the gear 600 is rotated counterclockwise, no engagement of the clutch takes place and sleeve 606 maintains its last assumed position.

To provide a positive lock and prevent accidental rotation of the sleeve 606, the inner face of pinion gear 600 is provided with two diametrically disposed slots 609—609 (see Figs. 7 and 8), and depending on the position of the pinion gear 600, one of the two slots 609 is engaged by a pin 610 carried by a bent arm 611 loosely pivoted at 613 and adjustably pivoted at 614.

To release the pin 610 when the gear 600 is to be rotated, the arm 611 is displaced by actuation of a ball 615 carried by a rod 616 as later to be more fully described.

To rotate the pinion gear 600, there is provided a rack 601 carried by a frame 620. The frame 620 is adjustably bolted to the bed-plate 10 and is provided with a rectangular groove 621 in which rides the rack 601. Rack 601 is furthermore guided in a guide block 625 secured to the frame 620 which also carries a bracket 617 to support the rod 616.

Figure 2:
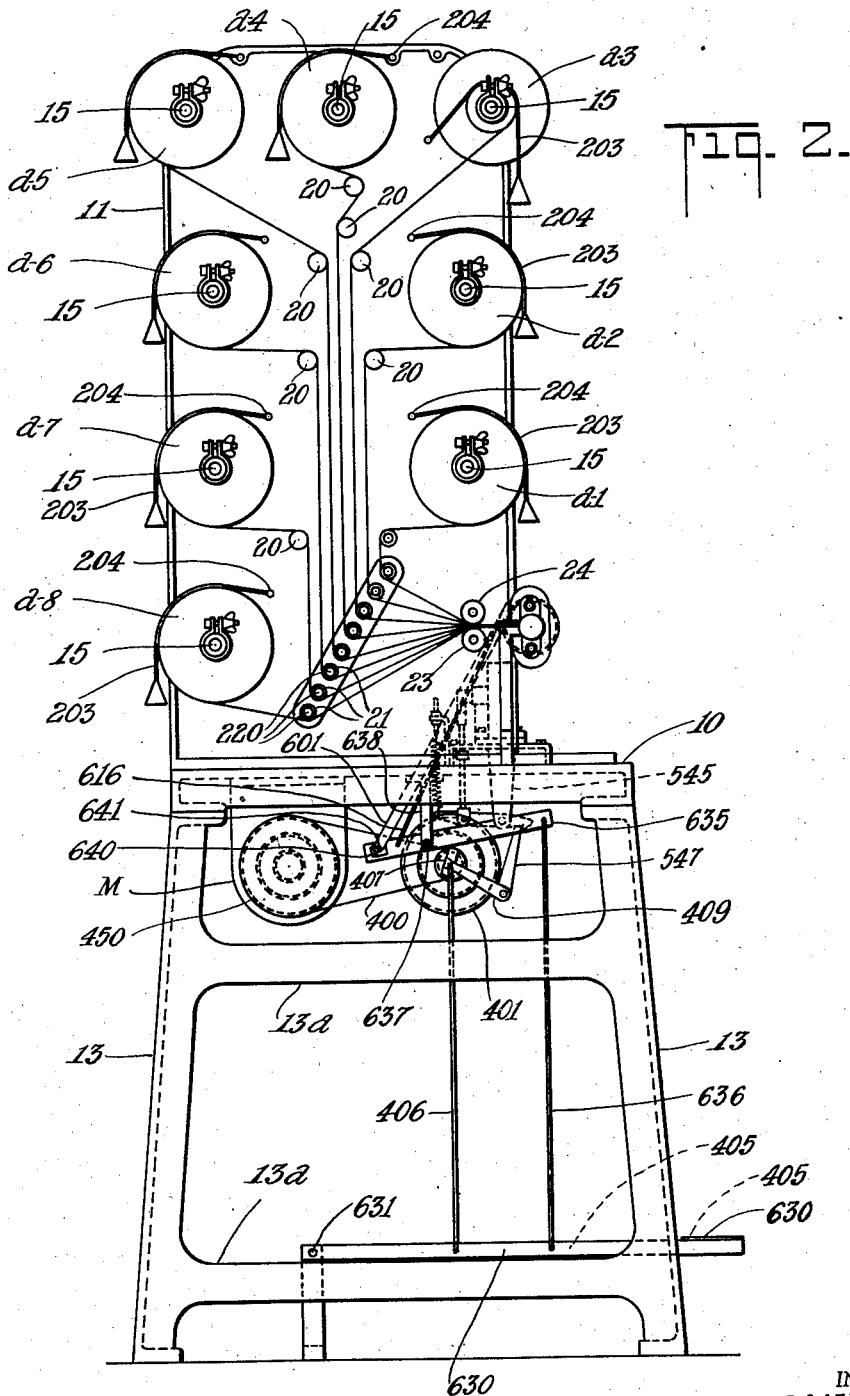
Fig. 2 is a side elevation of the winding machine of Fig. 1.

To operate the mandrel rotator there is provided, as shown in Figs. 1 and 2, a foot lever 630 fulcrumed at 631, and carrying a link 636 which engages one end of a lever 635 fulcrumed at 637 in a bracket 638 extending from the bottom of the bed-plate 10. On the other end of the lever 635 are successively secured the end of the rod 616 and the end of the rack 601.

To provide a delay in the operation of the rack 601 with respect to rod 616 and thus permit rod 616 to disengage the locking pin 610 from the slot 609, before the rack 601 starts rotation of pinion 600, the end of rack 601 instead of directly engaging lever 635, engages a rectangular slot 640 thereof by means of a pin 641.

Actuation of the rack 601, as previously described causes rotation of the mandrel rotator sleeve 606 which rotation brings into winding position one or the other of two winding mandrels 703 and 704 contained in a winding head mechanism.

The mandrel head mechanism is shown in Figs. 5, 7 and 8, and particularly in Fig. 8. As shown in Fig. 8, a winding head 700 is carried on the mandrel head rotating sleeve 606, for example, by a forced fit being provided between sleeve 606 and a bushing 780 of head 700.

The winding head 700 comprises for each of the winding mandrels 703 and 704 a set of parts which includes respectively, driven gears 701 and 702 and coupling means between these gears and their respective mandrels, to be later more fully described.

A gear 705 adapted to be coupled to the winding shaft 501 through its sleeve 709 serves to rotate the gears 701 and 702 respectively.

Engagement of the winding shaft 501 with the sleeve 709 takes place by means of a freewheeling clutch, as shown in Fig. 9. The shaft 501 is provided in its portion surrounded by sleeve 709 with three longitudinal recesses 706 in which are disposed rollers 707 and springs 781, similar to those described in connection with the clutch of the mandrel head actuator. Lateral displacement of gear 705 is prevented by a screw 728 threaded into the end of shaft 501.

Disposed between sleeve 709 and the mandrel head rotating sleeve 606 is a bushing 708, but if the sleeve 606 is of bearing material bushing 708 may be omitted.

The driven gears 701 and 702 are provided with integral cylindrical extending sleeves 710 and 711 respectively, which at their free end are provided with ratchet-like teeth 712 adapted to cooperate with corresponding teeth 713 of mandrel spindle releases 714.

Each of the mandrel spindle releases 714 is provided with two diametrically-disposed extension fingers 715, which serve to disengage each of the spindle releases 714 from its cooperating sleeves 710 and 711 respectively. To engage their respective mandrels 703 and 704 the spindle releases 714 are each provided with a square protruding portion 716 engaging a corresponding square slot 718 of a mandrel holder 717 each of which fixedly carries at its opposite end its respective winding mandrel 703 or 704. A coil spring 720 tensioned between an inward shoulder 703 of holder 717 and the head of a screw 719 secured in portion 716 tends to engage the respective teeth of the mandrel releases 714 and sleeves 710 and 711.

Surrounding the sleeve 606 and secured to bushing 607 is an annular ring cam 730.

At its uppermost portion the cam 730 is provided with a circular recess 784 which allows free rotation of the upper mandrel spindle release fingers 715. Beyond the recess 784 the periphery of the cam 730 is offset to provide a section 731 which by engaging the fingers 715, i. e. of the lower release spindle 714, disengages the ratchet-teeth 712 and 713.

The mandrel tail stock assembly of the winding machine is shown in detail in Figs. 5, 7 and 11. It comprises a tail stock 800 secured to the bed-plate 10 by a bracket 810, a bored knife retaining shaft 802 slotted at 817, and a spindle retaining block 801 fixedly secured to the shaft 802.

The tail stock 800 is provided with two offset portions 813 and 814 the latter of which is adapted to loosely receive one end of the shaft 802. The other end of the shaft 802 is fixedly secured to the winding head 700 by a flange coupling 815.

Disposed within the bore of the shaft 802 is a knife activating shaft 820 and within the slot 817 are two knife blades 821—821, each of which is provided with two diagonal slots 822 and 825 diverging toward the cutting edge of the blades. A pin 818 loosely passing through the slots 822 and fixedly held in the shaft 802 secures the blades 821 at one end within the shaft 802.

The other end of the blades 821 are disposed within a slot 823 at one end of the shaft 820 and are loosely held therein by a pin 824 passing through the slots 825 and secured in shaft 820.

At its other end the shaft 820 extends beyond the shaft 802 and is provided with a knob 826. A spring 828 disposed between the knob 826 and the end of the shaft 802 serves to maintain the shaft 820 in its extended position.

The spindle retaining block 801 is provided with two diametrically disposed mandrel retainer bushings 803 fixedly secured thereto.

Disposed within each bushing 803 as a sliding fit is the mandrel retainer 804, each preferably provided with a collar 831 to limit its sidewise motion to the left.

The operation of the mechanism of the invention is as follows:

A change gear 505, the number of teeth of which, in the simplest arrangement, corresponds to the number of turns of the condenser to be wound, is placed on shaft 506 and the idler gear bracket 509 with the idler gear 504 is accordingly adjusted to bring gears 502, 504 and 505 in proper engagement. The condenser stock, for instance, two layers of metal foil with three layers of paper interposed, are placed in alignment between the two halves of that mandrel 703 which assumes the top position and the mandrel retainer 804 moved to the extreme right to engage and hold the mandrel.

With the motor running, the clutch pedal 405 is depressed. Depressing this pedal actuates the clutch rod 406 which in turn causes the wedge block 407 to move to the right the shaft 403 carrying with it the stepped pulley 401. The sidewise motion of the pulley 401 brings it in frictional contact with pulley 402 which couples the driving motor through pulleys 401, 402 and belt 470 to the pulley 500 and to the mandrel 703, as will be later more fully explained.

Movement of the rod 406 through angular displacement of the shaft 408 disengages the brake 411 from the brake drum 412 and also causes the arm 547 to engage the recess 546 of the link arm 543; the arm 547 thereby retaining the shaft 408 in its displaced position so that after the operator removes his foot from the pedal 405 the pedal remains depressed, the clutch engaged and the brakeshoe disengaged until the automatic stop comes into operation.

The power transmitted to pulley 500 and to the winding shaft 501, rotates the winding mandrel 703 through the intermediary of the roller clutch enclosed in the gear sleeve 709, gears 705 and 701, the engaged mandrel release 714, and mandrel spindle 717. The rotation of mandrel 704 is prevented by the engagement of the fingers 715 of its associated mandrel spindle release 714 with the offset portion 731 of cam 730.

Concurrent with the rotation of mandrel 703 the shaft 501 causes through the gears 502, 504, 505, 508 and 516, the rotation of the cam 521.

A full rotation of cam 521 causes through actuation of push-rod 537 and link arm 543, the arm 547 to trip. This disengages pulley 401 from pulley 402, and releases the brakeshoe 411, thereby stopping the winding machine.

In practice I prefer to gradually decelerate the machine before removing the power and applying the brake. This I accomplish by placing on the machine a drag or excess load when the cam 521 is about to complete its revolution. This is effected by a stretching of the coil spring 552 by the lever 543 with the downward movement of the cam push-rod 537.

To prepare the winding machine for the winding of the next condenser and for removal of the just wound condenser, the operator actuates the foot lever 630. This causes, through actuation of rod 616 and rack 601, the gear 600 to rotate by 180°.

Rotation of gear 600 brings about through its enclosed clutch a corresponding rotation of sleeve 606 and of the entire mandrel head 700. This shifts the mandrel 703 to the lower position and mandrel 704 to the upper position. During this rotation the fingers 715 of the mandrel 703 engage the cam 730 and become outwardly locked by its offset portion 731 whereas the fingers 715 of mandrel 704 are disengaged from the cam 730 and are carried inwardly by the spring 720. As a result thereof, upon rotation of shaft 501, the mandrel 704 will not rotate, and mandrel 703 remains still.

The free-wheeling clutch disposed within the sleeve 709 of the driver gear 705 serves to prevent rotation of the shaft 501 during rotation of the head 700 especially during the interval prior to the engagement of the fingers 715 of the upper mandrel 703 by the offset portion 731 of cam 730.

When the winding head 700 has assumed its new position, the foot pedal 630 is released and the rack 601 and the rod 616 return to their normal position; the free-wheeling action of the mandrel head rotator clutch preventing the winding head 700 from returning to its former position as previously described.

Rotation of the winding head also rotates the knife retainer shaft 802 and the tail stock block 801.

When the wound condenser section is carried to bottom position by the mandrel 703 the metal and paper foils leading from the condenser section to the stock rolls come to rest on the knife retainer shaft 802 and the mandrel 704 with the slot 817 of the former in contact with the foils. Before severing the condenser from the stock the foils are secured to mandrel 704 by inserting its cupped portion 704a. After this the foils are severed at their portion between the condenser roll and mandrel 704, by the operator actuating the ball 826, which causes the knife blades 821 to forcefully project from the slot 817 of the shaft 802. The use of two blades 821 causes severance of the foil irrespective of which of its two positions the knife retainer shaft assumes.

The machine is now ready for the winding of another condenser of the same type, and is wound by depressing the foot pedal 405, as previously described. During the winding of the second condenser the operator removes the first condenser from mandrel 703.

In case a condenser of a different number of turns is to be wound, it is only necessary to change gear 505 and correspondingly adjust gear arm 509.

In case different stock is used for the condensers, changes are made in conventional manner.

While I have described my invention with regard to a specific embodiment and in a specific example, I do not wish to be limited thereto but desire the appended claims to be construed as broadly as permissible in view of the prior art.

What I claim is:

1. An automatic winding machine comprising a winding head, a plurality of winding mandrels disposed on said winding head, a winding shaft, and a cam in positive mechanical engagement with said shaft, means to rotate said head and successively place the mandrels in winding position and to connect with the winding shaft that mandrel which is placed in winding position, means associated with each mandrel to insure that the mandrel assume the identical rotary position about its axis each time the mandrel is brought into winding position, means disposed within the winding head to prevent rotation of the winding shaft and cam by the winding head during its rotation, and stopping means for the winding shaft actuated by said cam when the desired number of revolutions of the winding shaft have taken place, and means actuated by said cam to decelerate said shaft prior to the actuation of the stopping means.

2. An automatic winding machine comprising a winding head, two winding mandrels disposed on said winding head, a winding shaft, and a cam in positive mechanical engagement with said winding shaft, means to rotate said head and successively place the mandrels in winding position and means associated with the mandrels to connect with the winding shaft that mandrel which is placed in winding position, means to prevent rotation of the winding shaft and cam by the winding head during its rotation, said means insuring that the mandrel assume the identical rotary position about its axis each time the mandrel is brought into winding position, and stopping means for the winding shaft actuated by said cam when the desired number of revolutions of the winding shaft have taken place, and means actuated by said cam to decelerate said shaft prior to the actuation of the stopping means.

3. An automatic winding machine comprising a winding head, a winding shaft, two winding mandrels diametrically disposed on said winding head and adapted to receive winding stock, and a cam in positive mechanical engagement with said winding shaft, means to rotate said winding head and successively place the mandrels in winding position and to connect with the winding shaft the mandrel which is placed in winding position, means associated with the mandrels to prevent rotation of the winding shaft by the winding head during its rotation and while moving into position the winding mandrels, stopping means for the winding shaft, said cam rotated by said winding shaft and actuating said stopping means when the desired number of revolutions of the winding shaft have taken place, a normally inactive stock cutting means disposed within a slotted shaft centrally disposed on said winding head between said winding mandrels, said stock coming to rest on said slotted shaft upon rotation of said winding head, and means disposed in said slotted shaft for actuating said stock cutting means.

4. An automatic winding machine comprising a winding shaft, a driving motor, and a clutch interposed between said motor and said winding shaft, an automatic control mechanism for said winding shaft comprising a lever adapted to maintain said clutch in its engaged position, a cam which is rotated by said shaft and actuates said lever to effect the release of said clutch when the desired number of revolutions of the winding shaft have taken place, and a normally inactive drag actuated by said cam and adapted to decelerate said winding shaft prior to the release of said clutch by said lever.

5. An automatic winding machine comprising a winding shaft, a driving motor, a clutch interposed between said motor and said shaft, and an automatic control mechanism, said mechanism comprising, a cam, a lever, and a spring member affixed to said lever and serving as a normally inactive drag on said shaft, said lever adapted to maintain said clutch in its engaged position, said cam rotated by said shaft adapted to actuate said lever to effect release of said clutch and to actuate said drag by distorting said spring member.

6. In a high speed winding machine comprising a winding shaft and an automatic stopping mechanism for said shaft, means to decelerate said shaft before the stopping thereof, said means comprising a normally inactive drag comprising a spring member and a cam rotated by said shaft adapted to distort said spring member.

7. A winding machine comprising a winding head, a winding shaft, two winding mandrels diametrically disposed on said winding head, a cam and automatic stopping mechanism for said shaft, means to alternately place said mandrels in winding position, means associated with each of said mandrels to connect the positioned mandrel with said winding shaft and means to prevent rotation of said shaft while moving into position the winding mandrel, said cam rotated by said shaft and actuating said stopping means when a desired number of revolutions of the shaft have taken place.

8. A winding machine comprising a winding head, two winding mandrels disposed on said winding head, and a winding shaft, means to rotate said head and successively place the mandrels in winding position, means associated with said mandrels to disconnect the mandrels from the winding shaft and to fixedly lock the mandrels with respect to the winding head during its rotation, said means also insuring that each mandrel assume an identical rotary position about its axis each time the mandrel is brought into winding position.

9. In a winding machine comprising, a winding head, a winding shaft, two winding mandrels diametrically disposed in said winding head, means to rotate said winding head and successively place said mandrels into winding position, and means disposed in said winding head to prevent rotation of said mandrels with respect to said winding head during its rotation, said means comprising a free-wheeling clutch interposed between said winding shaft and said mandrels.

10. In a winding machine a winding shaft, a winding head carrying two diametrically disposed winding mandrels, means to selectively engage and disengage said mandrels from the shaft, said means comprising a releasing and locking member for each of said mandrels and a cam disposed about the shaft, means to rotate the head and cause engagement of one of said members with said cam to lock its associated mandrel, and cause disengagement of said cam from the other member to permit engagement of the other mandrel with said shaft.

MAX KNAB.